United States Patent [19]

Songer

[11] 3,960,409

[45] June 1, 1976

[54] WHEEL BALANCING WEIGHT

[75] Inventor: Hubert D. Songer, Murfreesboro, Tenn.

[73] Assignee: Perfect Equipment Corporation, Murfreesboro, Tenn.

[22] Filed: Nov. 25, 1974

[21] Appl. No.: 526,891

[52] U.S. Cl. ............................................. 301/5 B
[51] Int. Cl.² ........................................ B60B 13/00
[58] Field of Search ..................... 73/485, 486, 487; 301/5 B

[56] References Cited
UNITED STATES PATENTS

| | | | |
|---|---|---|---|
| 2,029,132 | 1/1936 | Skelton | 74/487 |
| 2,292,024 | 8/1942 | Dreher | 301/5 |
| 2,640,727 | 6/1953 | Kennedy | 301/5 |
| 3,093,528 | 6/1963 | Reich | 221/70 |
| 3,154,347 | 10/1964 | Grifith | 301/5 |
| 3,177,039 | 4/1965 | Skidmore | 301/5 |
| 3,273,941 | 9/1966 | Skidmore | 301/5 |
| 3,633,263 | 1/1972 | Hoeksema | 301/5 |

*Primary Examiner*—Herbert Goldstein
*Attorney, Agent, or Firm*—Harrington A. Lackey

[57] ABSTRACT

A wheel balancing device including a plurality of preformed balancing weights, such as lead, of uniform weight and length which are secured in end-to-end relationship upon an elongated tape having an adhesive back surface. The elongated tape is severable along transverse lines between the adjacent ends of adjacent pairs of weights so that the desired number of incremental weights and supporting tape portion may be separated from the other weights for adhesive attachment longitudinally circumferentially of the cylindrical rim portion of a vehicle wheel.

The incremental wheel weights are preferably pre-formed, not only to fit against the tape and cylindrical wheel rim, but also to be coiled to facilitate handling, transportation and storage.

6 Claims, 8 Drawing Figures

WHEEL BALANCING WEIGHT

BACKGROUND OF THE INVENTION

This invention relates to a wheel balancing device, and more particularly to multiple pre-formed wheel weights.

In the manufacture of pneumatic tires and also wheels and rims, it is extremely difficult to produce a tire or a wheel, or the combination of a tire and wheel to a degree of perfect balance. Therefore, there is a need for applying a counter-balancing weight to the wheel or rim to compensate for the imbalance. Heretofore, this need has been fulfilled by the application of lead weights molded around a steel clip which in turn is attached to the rim flange of the wheel.

Other types of lead wheel weights with different means of attaching the weights to the rims have been devised, as illustrated in the following patents:

U.S. Patents:

| | | |
|---|---|---|
| 2,292,528 | Kraft | Aug. 11, 1942 |
| 2,585,802 | Loewe | Feb. 2, 1952 |
| 2,640,727 | Kennedy | June 2, 1953 |
| 3,154,347 | Griffith | Oct. 27, 1964 |
| 3,177,039 | Skidmore | Apr. 6, 1965 |

French Patent:

| | | |
|---|---|---|
| 1,109,941 | Antraique | Oct. 5, 1955 |

The Kennedy, Griffith and Skidmore patents disclose that it is old to apply a unitary lead wheel weight to a tire or rim with adhesive means.

Both the Kennedy and Skidmore patents disclose that it is old to indent or notch a unitary lead strip into incremental weight values.

However, none of the above patents disclose a plurality of pre-formed, or pre-molded, uniform integral weights secured in end-to-end relationship upon an elongated tape having adhesive backing, for division or separation into predetermined weight values, by merely severing the tape.

SUMMARY OF THE INVENTION

It is therefore an object of this invention to provide a wheel balancing device including a single elongated tape of any desired length, but preferably of a length capable of being coiled upon itself, and supporting on its top surface a plurality of pre-formed, or pre-molded, uniform lead weights in end-to-end relationship. Each balancing weight is of a predetermined unit weight, such as one-half oz., so that any multiple of such incremental weights may be separated from the remainder of the weights by merely severing the tape, without having to sever, break or bend the weight material itself. The adhesive tape portion of the separated weights is then secured to the cylindrical surface of the wheel rim.

Each integral, pre-formed, balancing weight preferably has a bottom surface adapted to fit snugly through the tape against the cylindrical wheel rim portion, and to be held in that position, not only by the adhesion of the tape, but also by centrifugal force. Moreover, the secured weights are held against circumferential shifting relative to the wheel rim caused by the rapid forces of acceleration and deceleration of the wheel.

The incremental wheel weights are secured in end-to-end relationship upon the top surface of the tape in a manner which will permit coiling of the tape longitudinally about itself with the weights lying radially inward of the corresponding portion of the tape. Such coiling is permitted by adequate longitudinal spacing between the adjacent ends of the balancing weights, or by the shaping of the adjacent ends of the weights so that they diverge away from the bottom surface of the weight, such as by beveling, chamfering, or rounding the end surfaces into straight or convex arcuate end surfaces.

The bottom surface of each incremental balancing weight may constitute two planar sections intersecting along a median transverse line to form a dihedral angle of less than 180° above the bottom surface. The two end edges and the median line on the bottom surface form three distinct and spaced contact edges for squeezing the supporting tape portion against the cylindrical surface of the wheel rim. Such three-point contact engagement will not only assist in securing each weight to the rim, but will also minimize circumferential shifting of the weights relative to the wheel rim.

Each incremental balancing weight may also have a longitudinal arcuate surface, preferably a longitudinal cylindrical surface, which will have substantially the same radius as that of the cylindrical rim portion upon which the balancing device will be mounted. Any aberrations or irregularities in the cylindrical surface of the wheel rim will be compensated for by the compressible tape yielding to the points of greatest pressure between the bottom surface of each weight and the cylindrical surface of the wheel rim portion.

DESCRIPTION OF THE PREFERRED EMBODIMENT

Figure 2:
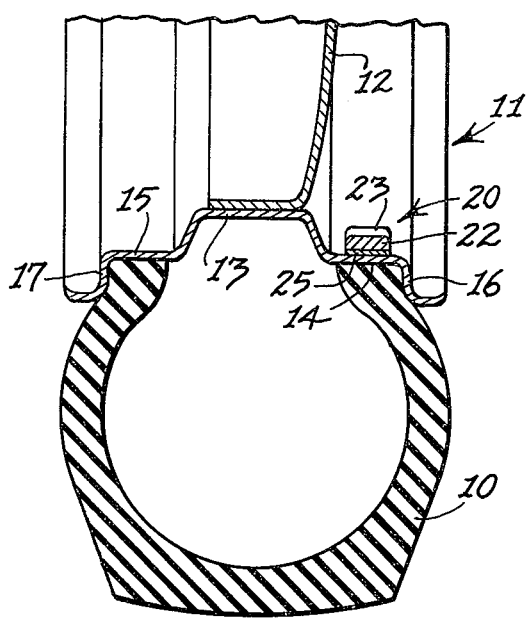
FIG. 2 is a section taken along the line 2—2 of FIG. 1.
Figure 1:
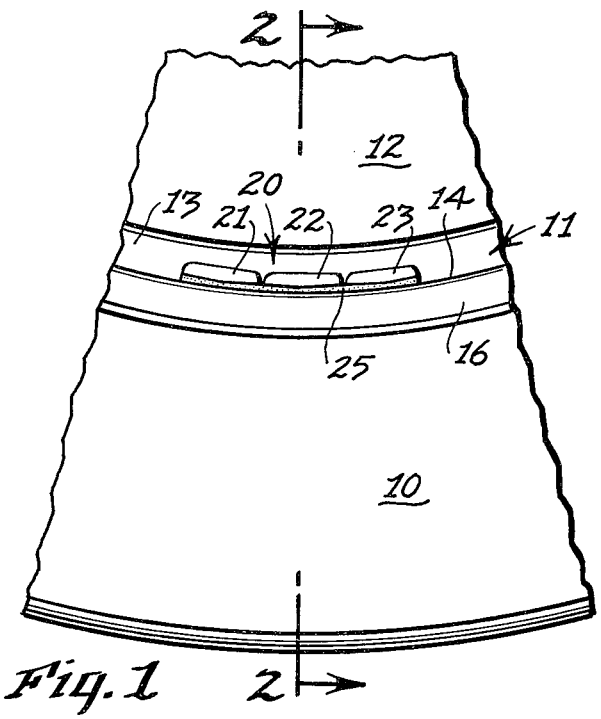
FIG. 1 is a fragmentary side elevation of the bottom portion of a pneumatic tire and wheel rim upon which the wheel balancing device, made in accordance with this invention, is mounted.

Referring now to the drawings in more detail, FIGS. 1 and 2 disclose a pneumatic tire 10 mounted upon a drop center rim 11 of a vehicle wheel 12. The drop center rim 11 includes a central well portion 13, outboard bead receiving flange 14, inboard bead receiving flange 15, and bead retainer flanges 16 and 17. The bead receiving flanges 14 and 15 are cylindrical and coaxial with the rotary axis of the wheel 12.

Figure 3:
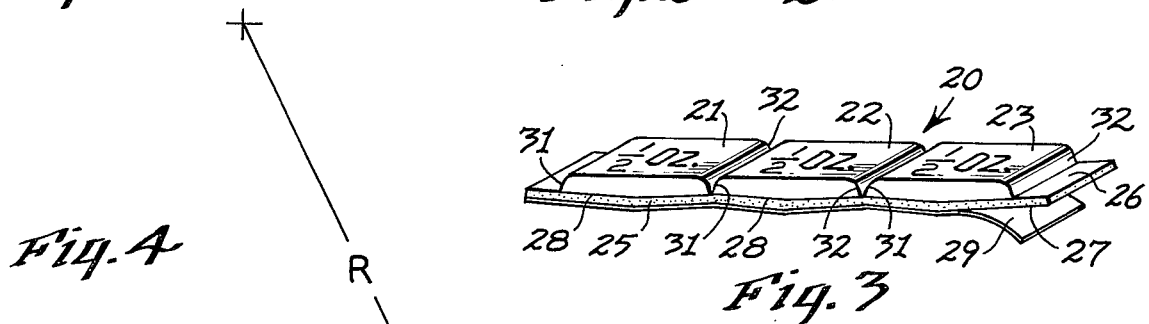
FIG. 3 is an enlarged, perspective view of the wheel balancing device disclosed in FIG. 1, with a portion of the adhesive backing, partially removed.

FIGS. 1, 2 and 3 disclose one form of wheel balancing device 20, including three, pre-formed, wheel balancing weights 21, 22 and 23, preferably made of lead, each being of uniform weight and size. Although three weights, 21, 22 and 23 are disclosed in FIGS. 1 and 3, nevertheless it will be understood that any number of a plurality of weights may be incorporated in the device 20.

As best disclosed in FIGS. 1 and 3, the incremental weights 21, 22 and 23 are mounted in end-to-end relationship upon an elongated tape 25 having a top surface 26 and a bottom surface 27. The bottom surfaces 28 of each incremental weight 21, 22 and 23, may be firmly secured to the top surface 26 of the tape 25 by suitable adhesive means. Moreover, the bottom surface 27 of the tape 25 is also preferably coated with a suitable adhesive which will bond the tape 25 to the cylindrical surface of the bead receiving flange 14.

In a preferred form of the invention, the tape 25 is a double-surface, pressure-sensitive, adhesive tape with the top adhesive surface 26 being secured to the bottom surfaces 28 of the incremental weights 21 – 23. The bottom surface 27 is coated with a pressure-sensitive adhesive which is covered with a removable backing strip 29 to protect the bottom adhesive surface 27 until it is desired to apply the tape 25 to the bead receiving flange or rim portion 14.

Each weight, 21, 22 and 23 is pre-formed, preferably premolded, from lead into its desired shape, so that each weight 21 – 23 is unitary and independent of any other incremental weight. The weights 21 – 23 are secured to the top surface 26 of the tape 25, with the adjacent left and right ends 31 and 32 closely spaced from each other, but forming a flexible transverse hinge joint in the tape 25 between the adjacent weight ends 31 and 32. Moreover, this flexible hinge joint between adjacent ends 32 and 31 is adapted to be easily severed, either by manual tearing of the tape transversely between the adjacent ends 31 and 32, or by mechanical severance with a pair of scissors or a knife. In this manner, no means are required to sever, bend, deform or break the lead material of the weights 21 – 23 themselves. Thus, where a single elongated strip of tape 25 supports numerous uniform pre-formed lead weights comparable to weight 21, such as thirty such weights, then the desired number of incremental weights, such as three, sufficient to match and counterbalance the eccentric inherent weight of the tire 10 or rim 11 or wheel 12, or any combination of these three, then the tape 25 is severed between the third and fourth weights.

Figure 4:
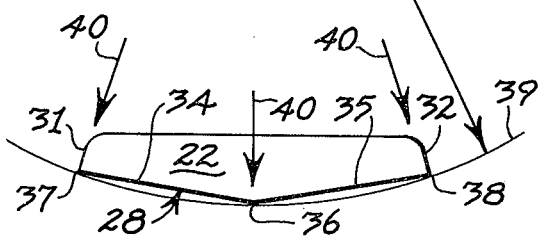
FIG. 4 is an enlarged, side elevation of one form of wheel balancing weight.
Figure 5:
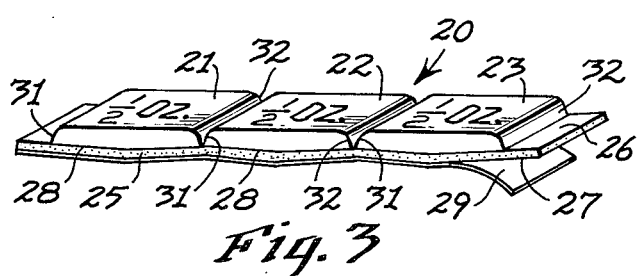
FIG. 5 is a side elevation of a wheel balancing device including three pre-formed, incremental, balancing weights having arcuate bottom surfaces, with their adjacent ends spaced apart.
Figure 6:
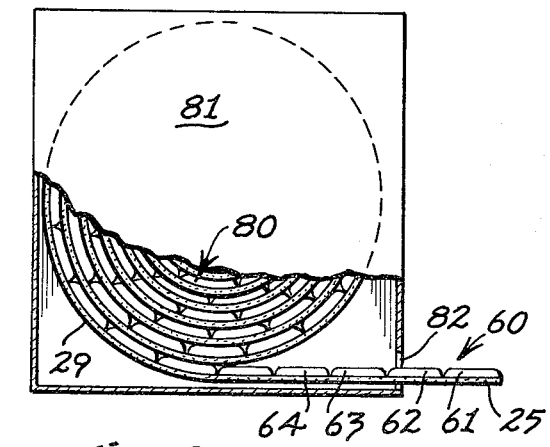
FIG. 6 is a view similar to FIG. 5, in which each incremental balancing weight has convex arcuate end surfaces.
Figure 7:
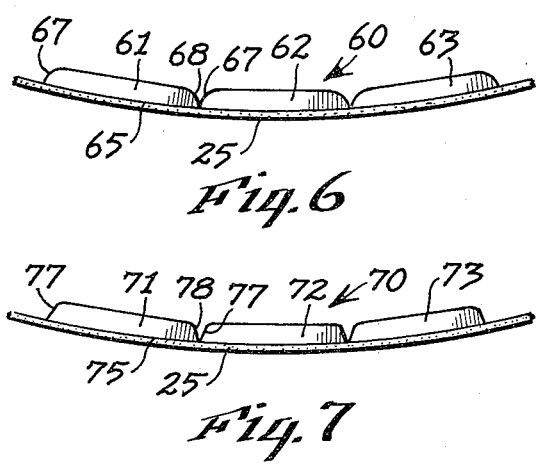
FIG. 7 is a view similar to FIG. 6 in which the adjacent end portions of the incremental wheel weights have beveled end surfaces.

In the preferred form of the device 20, the bottom surface 28 of each pre-formed weight 21, 22 and 23, is formed in a pair of planar sections 34 and 35, as best disclosed in weight 22 of FIG. 4. These planar sections 34 and 35 are preferably of equal size and intersect each other along a median line 36 transversely of the middle of the weight 22 and parallel to the end edges 37 and 38, to form a dihedral angle above the bottom surface 28 of less than 180°. The planar sections 34 and 35 are actually portions which have been relieved from an arcuate bottom surface contiguous with the parallel edges 37, 36 and 38, of a radius R, which is substantially equal to the radius of the cylindrical bead receiving flange 14. An incremental weight 22 having such dihedral planar sections 34 and 35 is adapted to be seated upon the cylindrical surface of the bead receiving flange 14 and establish firm 3-line contact between the edges 37, 36 and 38, and the cylindrical surface of the flange 14, even though the surface of the flange 14 may not be a true cylinder or is marred by irregular aberrations or is rough. Thus, when a balancing device 20, having the weights 21, 22 and 23 secured to the cylindrical rim 14 by the adhesive tape 25 is subjected to centrifugal force of the rotating wheel 12, maximum pressure will be exerted by the centrifugal force through the contact edges 37, 36 and 38, as illustrated by the force arrows 40 disclosed in FIG. 4.

Furthermore, the contact edges 37, 36 and 38 will also tend to bite into the tape 25 and exert additional frictional pressure at these three lines of contact against the cylindrical surface of the flange 14 to minimize circumferential shifting of the tape 25 on the rim portion 14.

Of course, the more pre-formed weights there are on the adhered tape 25, the greater the number of contact edges engaging wheel rim portion 14 in a single balancing device 20. For example, the three wheel weights 21, 22 and 23 are provided with a total of nine contact edges, three edges for each weight.

For a weight 22 of one inch, in which the medial intersection edge 36 is located equally between the end edges 37 and 38, mounted on a bead receiving flange 14 of a wheel 14 inches in diameter, the interior or upper dihedral angle between the planar sections 34 and 35 is approximately 178°. This angle varies slightly for wheels of various diameters, and would also vary slightly for wheel weights of different lengths.

In a preferred form of the invention, a wheel weight 22 would be one inch long, approximately five-eighths of an inch wide, with a thickness of approximately one-eighth of an inch.

FIGS. 5 – 8 disclose wheel balancing devices 50, 60 and 70, each including three incremental weights 51 – 53, 61 – 63 and 71 – 73, respectively, mounted end-to-end upon each tape 25. Each pre-formed weight 51 – 53 is practically identical to any of the balancing weights 21 – 23, except that the bottom surface 55 of each weight 51 – 53 is longitudinally arcuate, and preferably longitudinally cylindrical, having substantially the same radius as the radius of the cylindrical surface of the bead receiving flange 14. Moreover, the left and right ends 57 and 58 of the weights 51 – 53 may be more nearly vertical and spaced apart a greater distance than the ends 31 and 32 of the weights 21 – 23. The purpose of the extra spacing 59 between the adjacent ends 57 and 58 of the weights 51 – 53 is to permit the tape 25 to be coiled about itself, in a manner similar to the coil 80 disclosed in FIG. 8, with the weights 51 – 53 being radially inward of the tape 25 when coiled.

In order to accomplish the same function, that is the coiling of the tape 25, the weights 61 – 63 of the device 60 having arcuate bottom surfaces 65, identical to the arcuate bottom surfaces 55 of the weights 51 – 53, are provided with slightly differently formed end surfaces 67 and 68. The end surfaces 67 and 68 are arcuately convex to permit the end surfaces to roll against each other when wound in the coil formation 80. (FIG. 8)

In a similar manner, the weights 71 – 73, having arcuate bottom surfaces 75, are provided with end surfaces 77 and 78 which are beveled or chamfered so that they diverge away from each other away from their respective bottom surfaces 75, permitting the tape 25 to be coiled with the weights 71, 72, and 73 being radially inward of the tape 25 in the coiled position.

Figure 8:
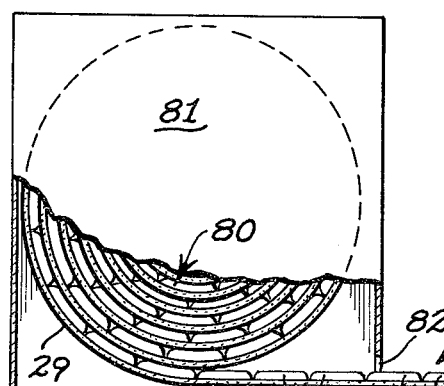
FIG. 8 is a side elevation of a container for a coil of weights similar to those disclosed in FIG. 6, with portions of the container broken away.

As disclosed in FIG. 8, the coil 80 can be an extremely long tape 25 mounted in a container 81 if desired, having a dispensing opening 82 through which the outer end of the tape 25 is adapted to pass. By pulling the tape 25 outward through the dispensing opening 82, any desired length of tape including the desired number of incremental weights, such as the three weights 61 – 63, may be severed by cutting or tearing transversely the tape 25 only between, for example, the weight 63 and the weight 64, without in any manner deforming, severing, bending or breaking the lead material in the weights per se.

It will be seen from the above description, that wheel balancing devices 20, 50, 60 and 70 of simple construction have been designed which will facilitate not only the use and speed of application of weights of any desired value to the rim of a wheel, but will also provide a wheel balancing device in which the taped weights are easily stored, transported and handled with a minimum of time and wasted space.

What is claimed is:

1. A wheel balancing device for a vehicle having a substantially cylindrical rim portion coaxial of the wheel, comprising:
   a. a plurality of pre-formed, unitary balancing weights of uniform weight and length, each weight having opposite free ends, a bottom surface and a top surface,
   b. an elongated tape having a top surface and a bottom surface,
   c. means securing the bottom surfaces of said weights to the top surface of said tape, said weights being in proximate end-to-end relationship longitudinally of said tape,
   d. at least portions of each adjacent pair of free ends of said weights adjacent the top surfaces of said weights being proximately spaced from each other,
   e. said tape being easily severable transversely of said tape between each adjacent pair of said free ends,
   f. adhesive means on the bottom surface of said tape for securing said tape longitudinally circumferentially of the rim portion of said wheel,
   g. the bottom surface of each unitary weight comprising at least three longitudinally spaced transverse line portions against which greater pressure is exerted through the corresponding portions of said tape by the opposing rim portions of said wheel than against any other portions of the bottom surface of said weight.

2. The invention according to claim 1 in which the bottom surface of each unitary weight comprises two planar surface sections intersecting along one of said transverse line portions to form a dihedral angle of less than 180° above said bottom surface in the longitudinal vertical plane of said corresponding weight.

3. The invention according to claim 1 in which said transverse line portions are tangent to a circle having a radius substantially equal to the radius of the cylindrical rim portion upon which said weights and tape are to be mounted.

4. The invention according to claim 1 in which all portions of each pair of the free ends of said weights are spaced apart sufficiently to permit longitudinal coiling of said tape to form a coiled tape, said weights being radially inward of the corresponding portions of said coiled tape.

5. The invention according to claim 1 in which the opposing surfaces of each adjacent pair of said free ends diverge away from the bottom surfaces of said corresponding weights to permit coiling of said tape to form a coiled tape, said weights being radially inward of the corresponding portions of said coiled tape.

6. The invention according to claim 5 in which the surfaces of said free ends are convex arcuate.

* * * * *